(12) United States Patent
Pijlman et al.

(10) Patent No.: US 8,414,162 B2
(45) Date of Patent: Apr. 9, 2013

(54) LIGHT GUIDE AND LIGHT-OUTPUT DEVICE

(75) Inventors: Fetze Pijlman, Eindhoven (NL); Willem Lubertus Ijzerman, Eindhoven (NL); Hugo Johan Cornelissen, Eindhoven (NL); Marcellinus Petrus Carolus Michael Krijn, Eindhoven (NL); Ramon Pascal Van Gorkom, Eindhoven (NL); Oscar Hendrikus Willemsen, Eindhoven (NL); Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/594,639

(22) PCT Filed: Apr. 9, 2008

(86) PCT No.: PCT/IB2008/051338
§ 371 (c)(1), (2), (4) Date: Oct. 5, 2009

(87) PCT Pub. No.: WO2008/126011
PCT Pub. Date: Oct. 23, 2008

(65) Prior Publication Data
US 2010/0046219 A1 Feb. 25, 2010

(30) Foreign Application Priority Data
Apr. 12, 2007 (EP) .................................... 07106023

(51) Int. Cl.
*F21V 5/02* (2006.01)

(52) U.S. Cl. .......................... 362/339; 362/616; 362/617
(58) Field of Classification Search .................. 362/235, 362/317, 327, 330, 339, 616, 619
See application file for complete search history.

(56) References Cited

U.S. PATENT DOCUMENTS

| 5,485,354 A * | 1/1996 | Ciupke et al. ................. 362/619 |
| 6,305,811 B1 | 10/2001 | Beeson et al. |
| 6,494,588 B1 * | 12/2002 | Okada ........................... 362/610 |

(Continued)

FOREIGN PATENT DOCUMENTS

| JP | 20032962795 A | 9/2003 |
| TW | 247863 B | 1/2006 |

(Continued)

*Primary Examiner* — John A Ward
(74) *Attorney, Agent, or Firm* — John F. Salazar; Mark L. Beloborodov (57) ABSTRACT

A light guide (11; 101; 111) comprising first and second oppositely arranged faces, an in-coupling portion (13*a-f*) for in-coupling of light from a light-source (12*a-f*; 95*a-f*; 102; 106*a-c*; 112*a-f*), and an out-coupling portion (15*a-f*; 103; 113*a-f*) located adjacent to the in-coupling portion (13*a-f*). The out-coupling portion (15*a-f*; 103; 113*a-f*) is configured to out-couple a primary light beam having a direction of propagation directed from a position in the in-coupling portion (13*a-f*) with a lower out-coupling efficiency than a secondary light beam having a direction of propagation directed from a position in the light guide (11; 101; 111) outside the in-coupling portion (13*a-f*). In this manner, a good mixing of light in the light guide can be achieved without imposing any particular requirements on the collimation of the in-coupled light.

15 Claims, 10 Drawing Sheets

U.S. PATENT DOCUMENTS

| | | | |
|---|---|---|---|
| 7,434,975 B2 * | 10/2008 | Lin et al. | 362/619 |
| 7,654,723 B2 * | 2/2010 | Chang | 362/620 |
| 7,740,374 B2 * | 6/2010 | Chang | 362/240 |
| 7,740,392 B2 * | 6/2010 | Itoh et al. | 362/625 |
| 8,087,811 B2 * | 1/2012 | Pakhchyan et al. | 362/606 |
| 8,277,104 B2 * | 10/2012 | Jeong et al. | 362/601 |
| 2002/0163810 A1 | 11/2002 | West et al. | |
| 2003/0099117 A1 | 5/2003 | Nakaoka et al. | |
| 2006/0126343 A1 | 6/2006 | Hsieh et al. | |
| 2009/0303410 A1 * | 12/2009 | Murata et al. | 349/58 |
| 2010/0302805 A1 * | 12/2010 | Jeong et al. | 362/612 |

FOREIGN PATENT DOCUMENTS

| | | |
|---|---|---|
| WO | 2006034831 A1 | 4/2006 |
| WO | 2007023415 A1 | 3/2007 |
| WO | 2007087710 A1 | 8/2007 |

* cited by examiner

LIGHT GUIDE AND LIGHT-OUTPUT DEVICE

TECHNICAL FIELD OF THE INVENTION

The present invention relates to a planar light guide comprising first and second oppositely arranged faces, an in-coupling position for in-coupling of light from a light-source, and an out-coupling portion located adjacent to the in-coupling position.

The present invention further relates to a light-output device including such a light guide and at least one light-source.

TECHNICAL BACKGROUND

As of today, fluorescent lighting is commonly used as the illumination system of choice for office lighting.

To enable architects and interior designers to create interior styles that clearly distinguish one building from the other, however, there is an increasing need to integrate lighting in interiors as unobtrusively as possible.

Conventional luminaires based on fluorescent lighting are known to have a minimum thickness of approximately 50 mm. Illumination systems based on alternative light-sources which allow for thin luminaries on the other hand, such as for illumination systems including a number of light-emitting diodes (LEDs) and a light guide for mixing and distributing the light emitted by the LEDs, offer much more freedom in designing the luminaire.

Achieving a sufficient degree of mixing of light in the light guide is an important factor for obtaining improved viewing characteristics for a luminaire based on the light guide. Such improvements may include, for example, increased uniformity of the light out-coupled from the light guide, and reduced maximum brightness.

WO 2006/034831 discloses one approach for achieving such mixing, according to which the light guide is provided with pyramid-shaped out-coupling facets which form such an angle with the out-coupling face that nearly parallel light undergoes several reflections in the light guide before being out-coupled.

A drawback of the light guide described in WO 2006/034831 is that it requires in-coupled light to be highly collimated to function properly.

SUMMARY OF THE INVENTION

It is therefore an object of the present invention to mitigate at least some of the drawbacks of the prior art and to provide an improved light guide, enabling use of a wider variety of light-sources.

According to the present invention, these and other objects are achieved by a light guide comprising first and second oppositely arranged faces, an in-coupling portion for in-coupling of light from a light-source, and an out-coupling portion located adjacent to the in-coupling portion. The out-coupling portion is configured to out-couple primary light beams having a direction of propagation directed from a position in the in-coupling portion with a lower out-coupling efficiency than a secondary light beam having a direction of propagation directed from a position in the light guide outside the in-coupling portion.

The light-guide may, for example, be made of a slab of a single dielectric material or combinations of dielectric materials. Suitable dielectric materials include different transparent materials, such as various types of glass, poly-methyl methacrylate (PMMA) etc. The light guide may be planar, flat or have a curved appearance. A slab-type light guide typically relies upon total internal reflection (TIR) in order to contain light coupled into the waveguide.

In a particular out-coupling portion of the light guide, a secondary light beam may originate from another in-coupling portion which may be comprised in the light guide, or may be light which originally comes from the in-coupling portion associated with the particular out-coupling portion, but has changed it direction of propagation due to, for example, reflection.

It should be noted that a light beam which is a primary light beam in one out-coupling portion is typically a secondary light beam in another out-coupling portion associated with another in-coupling portion, if any.

By configuring the out-coupling portion such that it out-couples primary light beams with a lower out-coupling efficiency than secondary light beams, it is ensured that a significant portion of the in-coupled light undergoes a number of reflections in the opposite faces of the light guide before being out-coupled as secondary light. This may, for example, be achieved by configuring the out-coupling portion such that the TIR (total internal reflection) condition is fulfilled for primary light beams, but not for secondary light beams.

In this manner, a good mixing of light in the light guide can be achieved without imposing any particular requirements on the collimation of the in-coupled light.

The light guide according to the invention may further comprise redirection means for redirecting the primary light beam, thereby converting the primary light beam into a secondary light beam.

Such a redirection means may comprise active and/or passive means. Active means may, for example, include an optical element having a controllable refractive index and/or reflectance, and passive means may, for example, include a fixed reflective structure and/or an interface between materials having different refractive indices.

The primary light beam propagating in a direction of propagation directed from the in-coupling portion can for instance be reflected by one or several reflectors which may be positioned at an edge of the light guide, or at a boundary of segments of the light guide. The reflectors at such segment boundaries may, for example, be formed by air gaps or another substance having a low refractive index, by a semi-transparent reflector coating or through selective provision of an essentially completely reflective coating. Such segments may be light guides which are assembled to form a composite light guide, or a light guide can be partly separated into segments by, for example, forming slits partly extending through the light guide at appropriate locations.

When, following reflection at the reflective structure, a light beam originally being directed from an in-coupling portion travels through the out-coupling portion in a different direction, it is more likely to be out-coupled. Thus, improved uniformity is obtained, even for light guides having a single in-coupling portion. Consequently, the provision of redirecting means improves the spatial as well as the angular mixing of light-beams in the light guide. This may be especially advantageous in situations where a plurality of differently colored light-sources are used in the light-guide.

The light guide according to the invention can further comprise an in-coupling structure formed at the in-coupling portion.

Such an in-coupling structure is a structure which is adapted to enable in-coupling of light from a light-source into the light guide, and can be arranged in various locations, such as at an edge of the light guide, somewhere along one of the oppositely arranged faces of the light guide, or internal to the light guide.

Moreover, the in-coupling structure may comprise beam-shaping means for collimating the in-coupled light.

By collimating light should here be understood limiting the angular distribution of light emitted by a light-source.

Through the provision of such beam-shaping means, in combination with a properly designed light-guide, collimated light can be out-coupled from the light-guide. This is important for, in particular, office lighting where glare should be avoided or at least limited.

The beam-shaping means may comprise conventional collimating optical elements, such as, for instance, reflective funnels or TIR elements. Alternatively, or in combination with such optical elements, the beam shaping means may be provided through a suitable geometry of the in-coupling structure itself.

The in-coupling structure may, furthermore, comprise a recess formed in the light guide from the first or second face.

The recess may extend partly through the light guide, or be formed as a through-going hole.

Hereby, a light-source can conveniently be inserted into the light guide from any of its faces.

For a light-guide having multiple in-coupling portions, these may advantageously be formed as recesses distributed over one of or both faces, enabling a uniform distribution of light-sources across the light guide.

Furthermore, the recess may advantageously have a rectangular cross-section in a plane parallel to the light guide, thereby enabling collimation of in-coupled light in a plane parallel with the light guide.

An in-coupling recess having a rectangular cross-section enables splitting of light emitted by a light-source emitting light in all directions, such as for instance an omni-directional LED, into separate beams along two orthogonal axes in a plane parallel with the light guide.

Such a recess configuration consequently limits the directions of primary light beams in a plane parallel with the light guide. This in turn facilitates the manufacture of the light guide, in particular with respect to the out-coupling portion.

Moreover, the light-guide according to the present invention may advantageously further comprise a collimating layer for decreasing angular spread of light out-coupled by the out-coupling portion.

By "collimating layer" should be understood a layer that collimates, that is, decreases the angular spread of light passing therethrough.

Through the provision of a collimating layer, the amount of glare can be reduced, which is especially advantageous when the light-guide is used in a luminaire for general lighting purposes.

The collimating layer may be provided on either face of the light-guide and may comprise any kind of collimating optical element known to the skilled person. For example, the collimating layer may comprise spaced apart structures with essentially triangular cross-sections, such that a funnel-like collimating structure is formed. Alternatively, a so-called concentric parabolic concentrator (CPC) can be used to further improved the collimation.

Collimating structures, whether having the above-mentioned triangular cross-section or any other collimating shape, such as the above mentioned CPC, may, for example be manufactured using extrusion moulding and subsequently applying a reflective coating to the structures. The coating may advantageously be applied on all sides of the collimating structures, but especially when there is no optical contact between the light-guide and the collimating structures, the reflecting coating on the side of the structures facing the light-guide can be dispensed with.

Additionally, the out-coupling portion may comprise a plurality of out-coupling structures.

These out-coupling structures may be provided on either of the faces of the light guide or internal to the light guide, and may be any structure exhibiting a direction dependent out-coupling performance. As an alternative or combination to the provision of out-coupling structures, the direction dependent out-coupling can be realized by means of, for example, suitable spatial variations in the refractive index of the light guide.

These out-coupling structures may advantageously include a plurality of grooves formed on at least one of the first and second faces of the light guide, each of the grooves essentially extending along a projection of a respective one of the primary light beams in the face of the light guide.

Forming out-coupling grooves, which run parallel to the main direction of the light directed from the in-coupling portion, on at least one of the faces, ensures that the light travels a certain distance, and is hence spread over a certain area, before it is coupled out. The light may, following reflection, be out-coupled in the out-coupling portion associated with the light-source from which it originated, or be out-coupled in a neighboring out-coupling portion.

The grooves can for instance be V-shaped, and have sides, or facets, which may advantageously be provided with a reflective coating.

According to one exemplary, collimation conserving configuration, the grooves may have an essentially V-shaped cross-section, with an opening angle of approximately 90°.

As an alternative or a complement to such a collimation conserving groove configuration, the light-guide may be provided with a collimating layer that comprises collimating structures which are aligned with the out-coupling structures. For out-coupling structures provided in the form of grooves, the collimating structures may then run in parallel with the grooves to collimate the light that is out-coupled by the grooves.

Through the provision of such collimating structures aligned with the out-coupling structures, a sufficiently low level of glare can be achieved without making the out-coupling structures as such collimation conserving. Hence, a larger variety of out-coupling structures can be used, which may facilitate manufacturing and thus lead to a reduced cost of the light-guide.

For optimal performance of the collimating structures, they should be well aligned with the out-coupling structures. Preferably, lateral misalignment between the collimating structures and substantially parallel out-coupling structures should be below 10% of the distance between neighboring out-coupling structures (the out-coupling structure pitch). Moreover, the angular displacement (rotation relative to the out-coupling structures) (in radians) of the collimating structures should preferably be smaller than 10% of the ratio between the distance between neighboring out-coupling structures and the length of the light-guide.

According to one embodiment, the out-coupling portion may, furthermore, include a portion of the light guide having an increasing thickness with increasing distance from the in-coupling portion.

By providing such an outwardly flaring structure with respect to the in-coupling portion, the angle of incidence on a face of the light guide of a light-beam having a given direction in a plane perpendicular to the light guide becomes dependent on the direction of the light beam in the plane of the light guide. A primary light beam which is directed from the in-coupling portion will be out-coupled with a lower out-coupling efficiency than a secondary light beam having another direction.

This structure may be provided as an alternative to, or in combination with the above-mentioned grooves.

In order to achieve a highly efficient out-coupling of light from the light-guide, the light-guide may additionally include a reflective layer arranged on one side thereof.

When the out-coupling portion comprises out-coupling structures at one face of the light-guide, the reflective layer may be provided on the same or opposite face depending on the configuration of the out-coupling structures.

In case the out-coupling structures are grooves, the reflective layer may be provided on some or all of the facets of the grooves. Alternatively, the reflective layer may be provided in the form of a reflective film that is arranged essentially in parallel with the light-guide at the out-coupling portion thereof.

By using such a reflective layer instead of applying a reflective layer on the facets of the grooves, manufacturing of the light-guide may be facilitated, however, typically at the cost of a decreased degree of collimation of the out-coupled light.

Such a reflective film may therefore advantageously be used in combination with the above-mentioned collimating layer.

Advantageously, optical contact between such a reflective film and the light-guide may substantially be prevented to avoid loss of light caused by unnecessary reflections in the reflective film. It is therefore preferred that essentially only light that is out-coupled from the light-guide by the out-coupling portion thereof hits the reflective film.

Optical contact can be prevented by spacing the reflective film apart from the light-guide. It should, furthermore, be noted that if a reflective film is placed in mechanical contact with a light-guide, there is typically hardly any optical contact therebetween.

Advantageously, the light guide according to the present invention can comprise a plurality of in-coupling portions, each being adapted to in-couple light from an associated light-source, and a plurality of out-coupling portions, each being adjacent to a corresponding one of the in-coupling portions and configured to out-couple a primary light beam having a direction of propagation directed from a position in the corresponding in-coupling portion with a lower out-coupling efficiency than a secondary light beam a direction of propagation directed from a position in the light guide outside the corresponding in-coupling portion.

In order to obtain suitable office as well as home illumination, it is desirable that light emitted from a light guide is uniformly distributed and that an uncomfortably high maximum local brightness is avoided. Uniform distribution of light can be obtained by having light emanating from a plurality of light-sources. However, light-sources, such as light-emitting diodes (LEDs), typically have slightly different color and flux characteristics, known as the binning problem. Thus, the light emitted by the different light-sources should preferably be well mixed in the light guide before being out-coupled in order to achieve a uniform distribution of out-coupled light. A good mixing of light is obtained, as primary beams to a large extent are contained within the light guide such that they travel a certain distance, and hence are spread over a certain area, before being coupled out as secondary light beams.

Light from a plurality of in-coupling portions, mixing in the light guide, furthermore contributes to robustness against failure of a few of the light-sources.

The light guide may, furthermore, advantageously comprise at least one guiding portion located between neighboring out-coupling portions to prevent cross-talk therebetween.

For some types of out-coupling structures, such as grooves with reflective sides, which may be provided on one or both faces of the light guide, a light beam may be out-coupled through successive reflections in sides of two or more grooves. Such successive reflections, which would typically result in an unwanted redirection of the out-coupled light beam, can be avoided by providing an unstructured guiding portion at least between selected portions of neighboring out-coupling portions.

Furthermore, the in-coupling portions can be arranged in an array forming a rectangular grid pattern.

The grid pattern may be formed by square or non-square rectangles.

Additionally, the light guide according to the invention may further comprise at least one omni-directional out-coupling portion configured to out-couple light beams with essentially equal out-coupling efficiency regardless of their direction in a plane parallel with the light guide.

By providing such omni-directional out-coupling structures at suitable locations across the light guide, preferably between out-coupling portions associated with neighboring in-coupling portions, it is ensured that light-beams originating from one in-coupling portion which happen to have a direction coinciding (or being diametrically opposite) with that of a primary light beam in an out-coupling portion associated with another in-coupling portion is in fact out-coupled from the light-guide and does not proceed to be absorbed or scattered at an in-coupling portion.

The omni-directional out-coupling structures may be provided in the form of any conventional out-coupling structures which out-couple light independent of the direction, in the plane of the light-guide, of the light.

Furthermore, the light guide according to the invention can comprise a plurality of omni-directional out-coupling portions, each being located on a diagonal in the rectangular grid pattern array, between two neighboring in-coupling portions.

Moreover, the planar light guide having a plurality of in-coupling portions arranged in a grid-shaped array may advantageously comprise a plurality of in-coupling recesses, each being provided at a corresponding one of the in-coupling portions and having a rectangular cross-section parallel to the planar light guide, wherein opposite corners of each of the rectangular in-coupling recesses essentially coincides with a corresponding grid line in the grid pattern, and each of the out-coupling portions comprises four sets of grooves being essentially parallel within each set, provided on at least one of the first or second faces, each set of grooves extending substantially perpendicularly to an associated side of the rectangular in-coupling recess.

In this configuration, the rectangular in-coupling structures collimate the light, enabling the provision of simplified out-coupling structures extending in two principal directions only.

As stated above, the in-coupling recesses may be provided in a square or a non-square grid-shaped array. By selecting a non-square grid, the out-coupling grooves are not directed directly at a neighboring in-coupling structure. Hereby, less light is lost by absorption or scattering at neighboring in-coupling positions.

The light guide according to the present invention can furthermore advantageously be comprised in a light output device, such as a luminaire, further comprising at least one light-source arranged at said in-coupling portion.

Other aspects, benefits and advantageous features of the present invention will be apparent from the following description and claims.

BRIEF DESCRIPTION OF THE DRAWINGS

These and other aspects of the present invention will now be described in more detail, with reference to the appended drawings showing a currently preferred embodiment of the invention, wherein:

FIG. 2b illustrates the dimensioning of the in-coupling recess in FIG. 2a;

FIG. 11b is a cross-section view of the luminaire in FIG. 11a.

DETAILED DESCRIPTION OF PREFERRED EMBODIMENTS OF THE INVENTION

The present detailed description primarily relates to luminaires comprising a planar light-guide and one or several light-emitting diodes arranged in in-coupling recesses provided in one of the faces of the light-guide.

It should be noted that this by no means limits the scope of the invention, which is equally applicable to other types of light-sources, such as semiconductor lasers, and other kinds of in-coupling structures, including, for examples mirrors, prisms etc.

In the following, a number of preferred embodiments will be described.

Figure 1A:
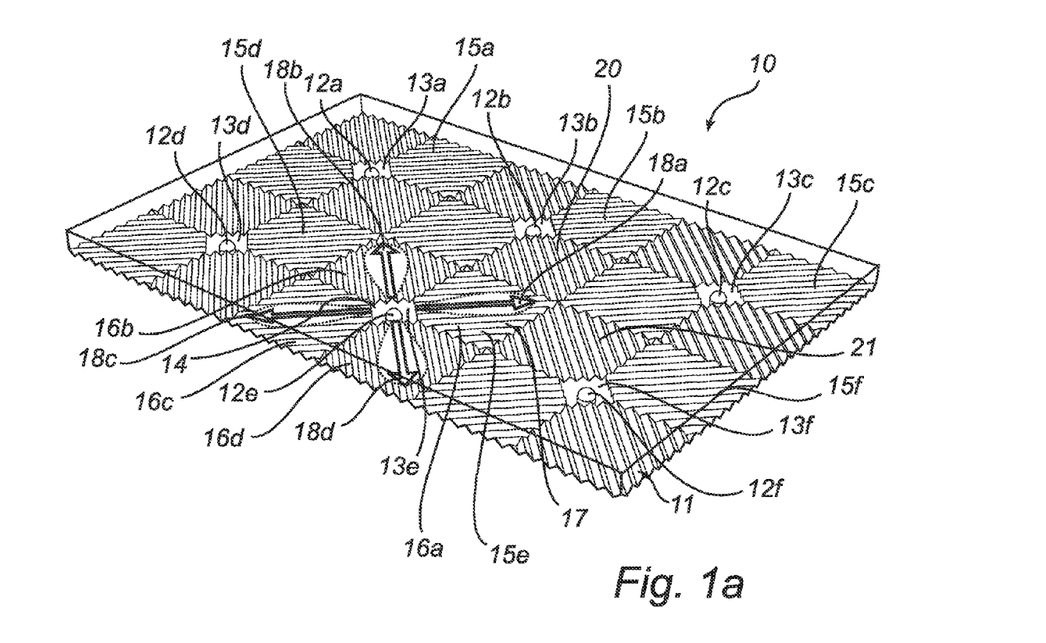
FIG. 1a is a schematic top view of a exemplary embodiment of a luminaire according to the present invention, having a plurality of light-sources arranged in a square grid array.

First, with reference to FIGS. 1a-e, a basic configuration of a luminaire having a plurality of light-sources arranged in a square grid array will be described. In FIG. 1a an exemplary luminaire 10 is shown, comprising a light guide 11 and a plurality of light-sources 12a-f, here in the form of omni-directional LEDs, located at corresponding in-coupling portions 13a-f, which in FIG. 1a each are provided with an in-coupling structure in the form of a recess 14 (only one of these recesses is specifically indicated in FIG. 1a for reasons of clarity of drawing) having a square cross-section in the plane of the light guide 11. Adjacent to each in-coupling portion 13a-f, an associated out-coupling portion 15a-f is provided. Each of these out-coupling portions comprises four regions 16a-d having groove-shaped out-coupling structures 17 extending in the directions 45°, 135°, 225°, and 315° with respect to the centrally located in-coupling portion 13e.

By forming the in-coupling structure as a recess 14 having a rectangular/square cross-section in the plane of the light guide 11, light emitted by an uncollimated light-source 12e, such as an omni-directional LED, is collimated in the plane of the light guide 11 and thus split into four separate beams 18a-d along two orthogonal axes as schematically indicated in FIG. 1a. This collimating property of the in-coupling recess 14 will be described in greater detail below in connection with FIGS. 2a-c.

As can be seen in FIG. 1a, the in-coupling recesses 14 are oriented in such a way that the directions of the beams 18a-d essentially coincide with the directions of the out-coupling structures 17 in the four regions 16a-d of the out-coupling portion 15e. Hereby, a light beam 18a in-coupled in the light guide 11 at in-coupling portion 13e, will encounter either parallel grooves 17, which do not out-couple the light, or perpendicularly oriented grooves 20, 21, which do out-couple the light. This is illustrated in FIG. 1b for the beam 18a only, light is out-coupled through the indicated portions 22a-d of the luminaire 10.

Figure 1B:
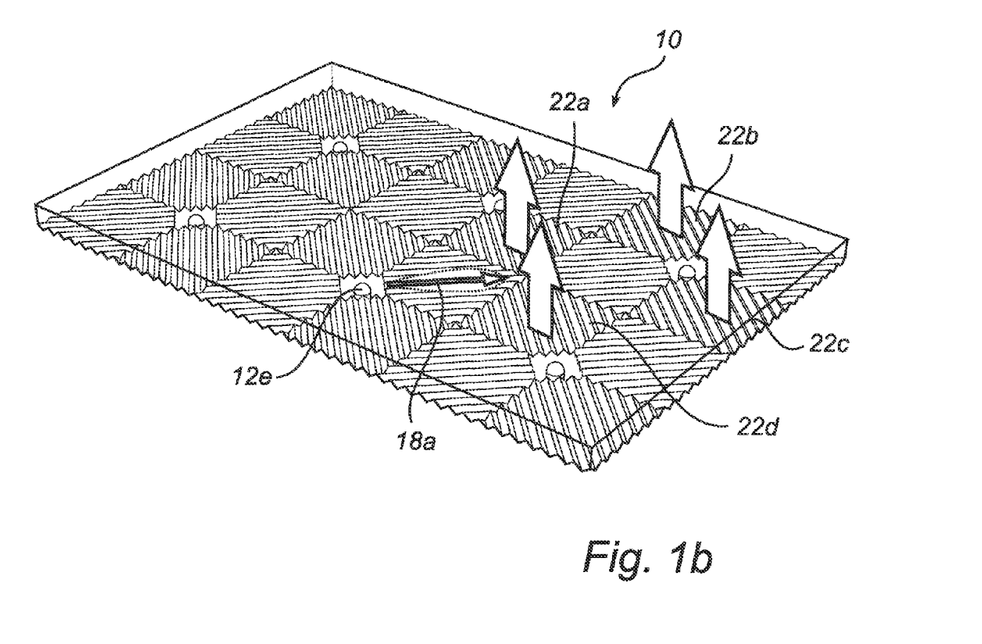
FIG. 1b schematically illustrates the light emitted by the luminaire in FIG. 1a in an exemplary case where a partial light beam at one in-coupling portion is taken into account.

The out-coupling of light emitted by a particular light-source need not necessarily take place in an out-coupling portion of the light guide associated with another light-source, as is illustrated in FIG. 1b. Instead, the light from a light-source can be out-coupled in the out-coupling portion associated with that light-source following reflection so that the light beams emitted by the light-source change direction in the plane of the light guide. Consequently, referring to FIG. 1c and considering one of the primary light beams 18a emitted by the light-source 12e only, this primary light beam 18a can be converted to secondary light beams upon reflection at reflective structures, here in the form of air slits 23a-b (only two of these air slits are indicated here for the sake of clarity of drawing) provided in the light guide 11. These secondary light beams are then out-coupled by the out-coupling structures 17 (and, to a lesser extent, by other out-coupling structures in the light guide 11 as indicated by the smaller arrows in FIG. 1c) in the segment 16a of the out-coupling portion 15e associated with the light-source 12e as is indicated by the big arrow in FIG. 1c.

This effect may be achieved in a variety of ways. For example, the light guide 11 may comprise separate light guides which may, for example, coincide with the out-coupling portions referred to above. These separate light guides may, for example, be isolated from each other by air slits.

Figure 1C:
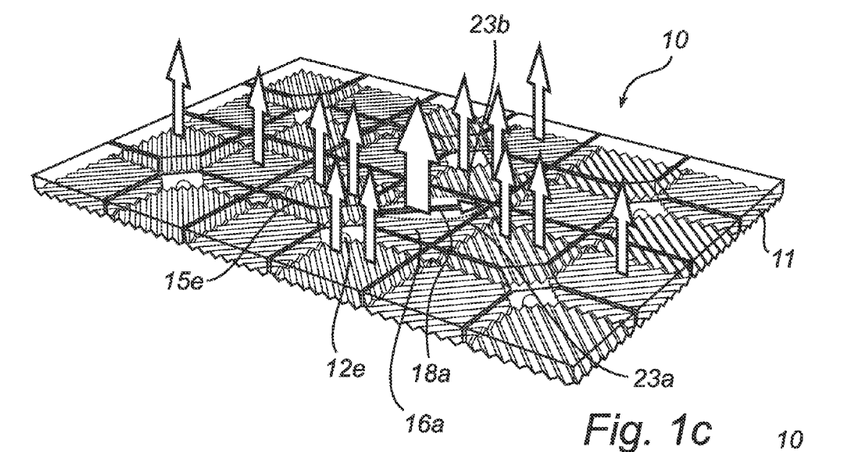
FIG. 1c schematically illustrates the light emitted by the luminaire in FIG. 1a in an exemplary case where a partial light beam at one in-coupling portion is taken into account and air slits are provided between out-coupling portions.

As is schematically illustrated in FIG. 1c, the light distribution across the luminaire is then completely altered, due to reflections at the boundaries between the light guide segments. As an alternative to the air slits 23a-b indicated in FIG. 1c, the light guide segments may be glued together with a low refractive-index glue, in which case the respective fractions of light reflected at segment boundaries and crossing segment boundaries will shift, leading to a distribution of out-coupled light which is intermediate between the situations illustrated in FIGS. 1b and c. According to a further alternative, reflective structures, for example in the form of air slits may be formed at selected locations in an integral light guide.

The redirection discussed above in connection with FIG. 1c is especially advantageous in case differently colored light-sources are used, as will be explained below with reference to FIGS. 1d-e.

Figure 1D:
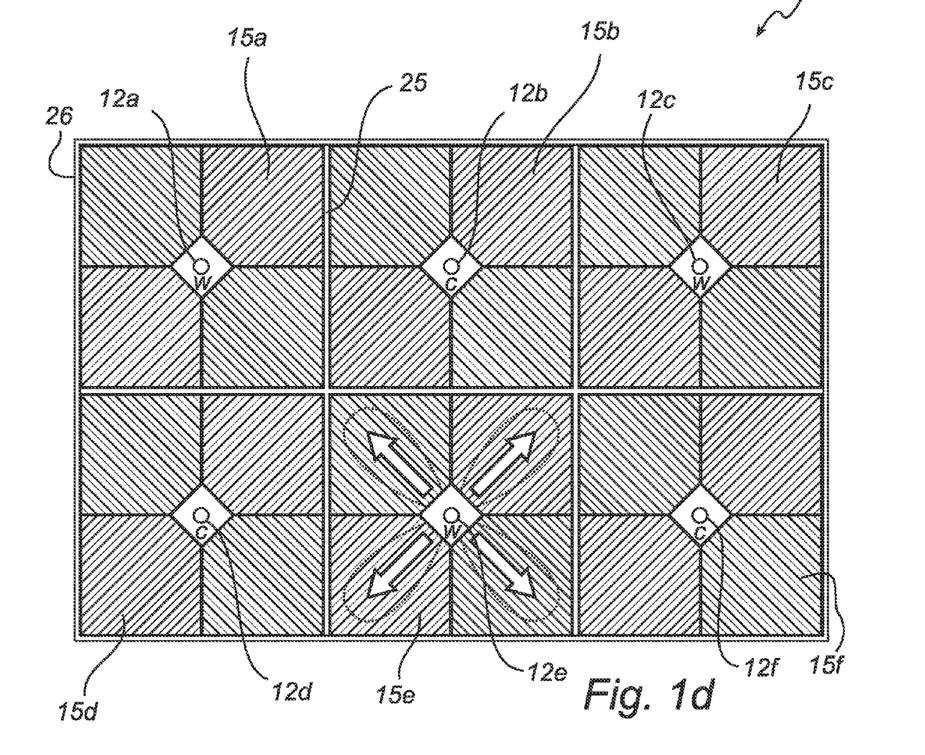
FIG. 1d is a plane view of the luminaire in FIG. 1a having differently colored light-sources and semitransparent mirrors provided between out-coupling portions associated with different light-sources.

FIG. 1d is a schematic plane view of a luminaire 10 essentially corresponding to that depicted in FIG. 1c, with the exception that redirection means in the form of reflecting structures are provided at the boundaries between the out-coupling portions 15a-f of the luminaire only and not at the boundaries between out-coupling segments within an out-coupling portion. Furthermore, the reflecting structures at internal boundaries are provided in the form of semi-transparent mirrors 25, while the reflecting structures at the external boundaries are provided in the form of essentially completely reflecting mirrors 26.

In the luminaire 10 in FIG. 1d, half of the light-sources 12a, c, e emit warm white light, while the remaining light-sources 12b, d, f emit cold white light. In such a situation, with differently colored light-sources, bands of differently colored light may be perceived by a user if no reflecting structures are provided between the out-coupling portions.

The reason for these colored bands to appear is that when looking at certain positions into the luminaire 10 only certain light-sources are visible that each seem to be at a different location.

Through the provision of the semitransparent mirror 25 at the boundaries between the out-coupling portions, as indicated in FIG. 1d a mirror image of each light-source, for example 12b is created at the position of the neighboring light-source 12a, c, e. If differently colored light-sources are positioned at neighboring positions, as is indicated with "W" and "C", respectively, in FIG. 1d, a good color mixing can be achieved To achieve an even further improved color mixing, however, also the special conditions at the edges of the luminaire should be considered.

Figure 1E:
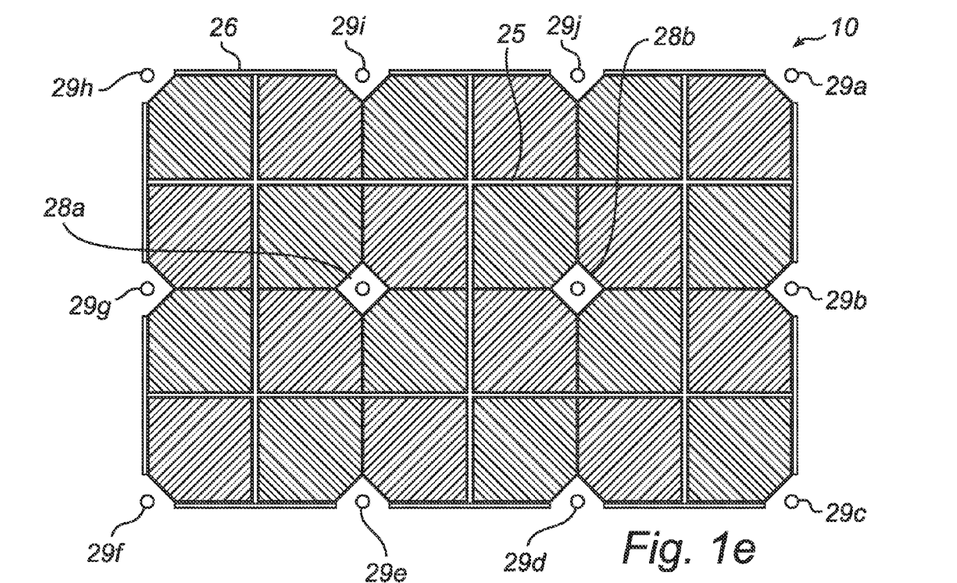
FIG. 1e is a plane view of another luminaire having differently colored light-sources and semitransparent mirrors, in which the edges of the luminaire are modified to provide improved color uniformity of the out-coupled light.

This is schematically illustrated in FIG. 1e, where a small exemplary luminaire 10 is shown having two light-sources 28a-b located in the interior of the luminaire 10 and 9 light-sources 29a-j located at the outer boundary thereof. As is understood by looking at FIG. 1e, the light-sources 29a-j at the outer boundary of the luminaire should, for reasons of symmetry, no only have alternating color, but also be, compared to the light-sources 28a-b located in the interior of the luminaire 10, half the size and emit about half the amount of light for light-sources 29b, d, e, g, i, j along the edges and about a quarter of the size and emit about a quarter of the amount of light for light-sources 29a, c, f, h at the corners of the luminaire.

Furthermore, an essentially completely reflective mirror 26 should be present along the outer boundary of the luminaire 10. As an alternative to half sized and quarter sized light-sources, full-size light-sources with half and quarter intensity may be used. When the light-sources 28a-b, 29a-j are realized using light-emitting diodes (LEDs), one option is to provide each of the light-sources 28a-b located in the interior in the form of 4 LEDs, and provide the light-sources along the boundary in the form of 2 LEDs and one LED, respectively. In this case, each of the LEDs should emit substantially the same amount of light.

The semitransparent mirrors 25 between the out-coupling portions 15a-f in FIGS. 1d and 1e may, for example be provided in the form of an essentially continuous semitransparent reflective layer, by an air slit of suitable dimensions, or in the form of essentially completely reflecting structures covering a portion, say half, of the boundary surface. In this case, the regions where the reflection is about 100% and about 0% should ideally be smaller than the extension of the light-source or, when applicable, LED comprised in the light-source.

Furthermore, the luminaires shown in FIGS. 1d and 1e can be expanded to more than two colors by precollimating the beams and directing them more along the diagonals of the out-coupling portions 15a-f.

Figures 2A, 2C:
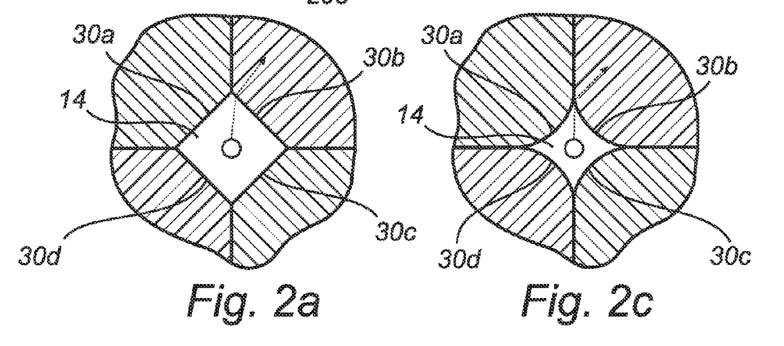
FIG. 2a is a plane view of an exemplary rectangular in-coupling recess, in which its collimating properties are schematically illustrated.
FIG. 2c illustrates a modified in-coupling recess wherein the sides connecting the corners of the recess are curved to achieve a further improved collimation.
Figure 2B:
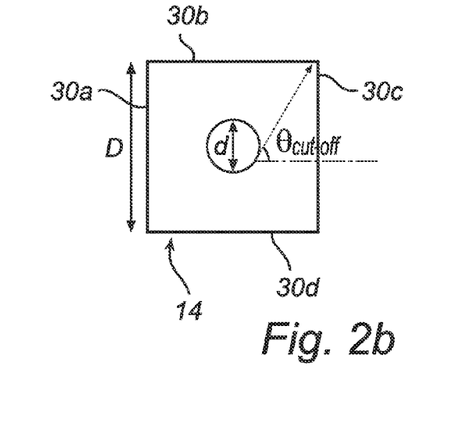

It should be noted that the luminaire 10 described above, as well as other exemplary luminaires discussed below are illustrated in a simplified and schematic manner. In particular, a real luminaire typically has a considerably larger number of light-sources. However, the embodiments disclosed herein should be sufficient for enabling a person skilled in the relevant art to make and use the present invention. With reference to FIGS. 2a-c, exemplary in-coupling structures in the form of recesses for collimating light emitted by the light-sources 12a-f in the plane of the light-guide will now be described.

In FIGS. 2a-b, an in-coupling structure in the form of a rectangular, here square, in-coupling recess 14 is schematically illustrated. As is indicated by the arrow in FIG. 2a, a beam of light hitting the wall of the recess is refracted towards the normal of the wall of the recess 14 such that the light emitted by an omni-directional light-source is split up into 4 different beams of light.

Turning now to FIG. 2b, the dimensioning of the rectangular recess 14 in FIG. 2a for achieving an acceptable degree of collimation in the plane of the light guide 11 in FIG. 1a will be discussed. For a point source, each of the four beams 18a-d is collimated (in air) within 2×45 degrees. For a finite source, however, the length D of the sides 30a-d (assuming a square cross-section) of the recess 14 should be about 2.5 times the source diameter d, in order to produce a cut-off angle $\Theta_{cut-off}$ of 60 degrees, as is schematically illustrated in FIG. 2b. In order to achieve a collimation in the plane of the light guide 11 which is narrower than 2×45 degrees, additional beam-shaping means, such as conventional collimator funnels may be used.

Simulations and experiments have shown that an improved collimation in the plane of the light-guide can be achieved by making the walls 30a-d of the recess 14 concave as is schematically illustrated in FIG. 2c. In fact, using in-coupling structures such as those shown in FIG. 2c, a collimation that is narrower than 2×45 degrees can be achieved.

Figure 3A:
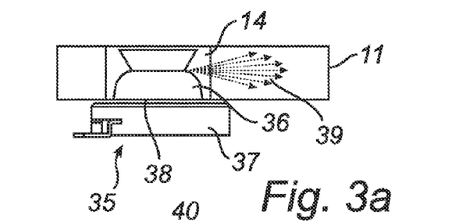
FIGS. 3a-b are schematic cross-section views along a section perpendicular to the luminaire in FIG. 1a illustrating exemplary beam-shaping structures for collimating light in a direction perpendicular to the light-guide.
Figure 3B:
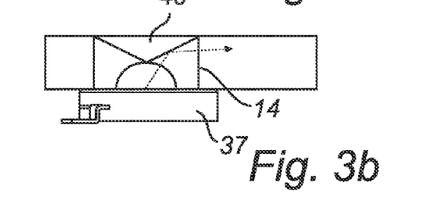

With reference to FIGS. 3a-b, two exemplary beam-shaping means for achieving collimation in a plane perpendicular to the light guide 11 will be briefly described.

In FIG. 3a, a side-emitting LED package 35 is shown, including a collimating TIR (total internal reflection) element 36 inserted in the in-coupling recess 14 in the light guide 11. Light emitted by the LED 37 is coupled into the TIR element 36 at an in-coupling face 38 thereof and then, through the geometry of the TIR element internally reflected to be emitted as a beam 39 (here only shown in one direction) which is collimated in a direction perpendicular to the light guide 11.

FIG. 3b schematically illustrates another exemplary beam-shaping means in the form of a reflective funnel 40 which redirects light emitted by the LED 37 as indicated by the beam drawn in FIG. 3b.

Having thus described various in-coupling structure configurations in connection with FIGS. 2a-c and FIGS. 3a-b, a number of exemplary out-coupling structure configurations will now be described with reference to FIGS. 4a-c and FIGS. 5a-c.

Figure 4A:
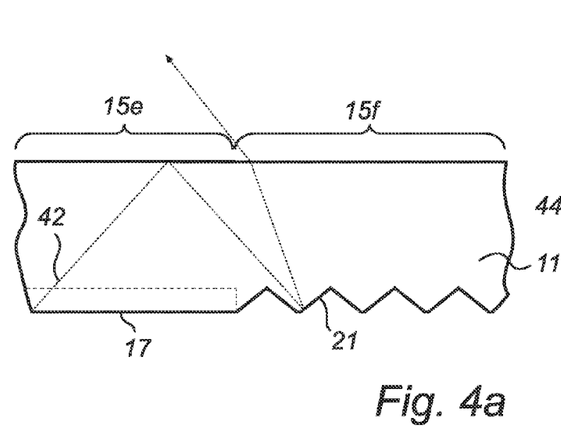
FIG. 4a is a cross-section view of the luminaire in FIG. 1a illustrating the propagation of a light beam when traveling between neighboring out-coupling portions.

In FIG. 4a, a cross-section of the light guide 11 is schematically shown parallel to a light beam 42 in-coupled at in-coupling portion 13e in FIG. 1a. The light beam 42 passes from out-coupling portion 15e having out-coupling grooves 17 which are essentially parallel to the direction (in the plane of the light guide 11) of the light beam 42 to out-coupling portion 15f having out-coupling grooves 21 which are substantially perpendicular to the direction of propagation of the light beam 42.

As is evident from FIG. 4a, the light beam 42 will be contained in the light guide as long as it remains in the out-coupling portion 15e associated with the in-coupling portion 13e from which the light beam 42 is directed, and be out-coupled through the top face of the light guide 11 following reflection in the perpendicular groove-shaped out-coupling structures 21.

Through a suitable configuration of such V-shaped out-coupling grooves 21 as schematically illustrated in FIG. 1a, light can, on the average, be out-coupled essentially perpendicularly to the light guide 11. Furthermore, the out-coupling structures can be configured to conserve the collimation of the in-coupled light, thereby avoiding glare. One example of such a suitable configuration is to provide the out-coupling structures as reflective grooves, which are oriented at 45° in the light guide, as indicated in FIG. 1a, and have a symmetrical opening angle of 2×45° as illustrated in FIG. 4a.

Figure 4B:
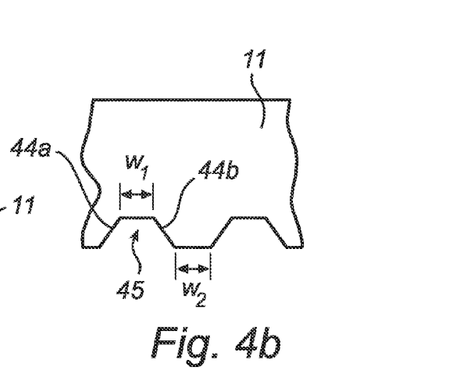
FIG. 4b is a cross-section view of the light guide in FIG. 1a schematically illustrating out-coupling structure design parameters for controlling out-coupling from the light guide.

As is schematically illustrated in FIG. 4b, the reflective sides 44a-b of the grooves 45 may be spaced apart by a distance $w_1$. Furthermore, the grooves 45 may be mutually spaced apart by a distance $w_2$. These distances $w_1$, $w_2$ are important design parameters, and through a suitable selection thereof, the out-coupling efficiency of the corresponding portion of the light guide 11 can be controlled. By increasing the distances $w_1$ and $w_2$, the out-coupling efficiency can be gradually decreased.

Figure 4C:
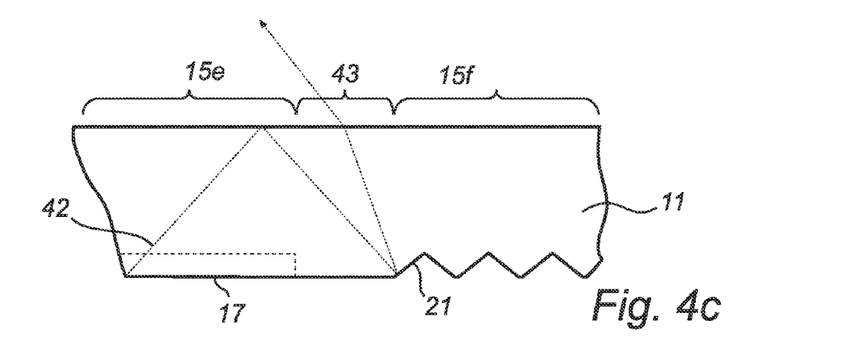
FIG. 4c is a cross-section view of a variation of the luminaire in FIG. 1a, further including un-structured guiding portions between out-coupling portions.

In FIG. 4c, a variation of the luminaire in FIG. 1a is schematically illustrated, where an unstructured guiding portion 43 is provided between the out-coupling portions 15e-f. This guiding portion 43 reduces the cross-talk between out-coupling structures 17, 21 in neighboring out-coupling portions 15e-f.

As mentioned above, glare perceived by a user of the luminaire 10 can be reduced by providing out-coupling structures that conserve the collimation of the light in the light-guide 11. An example of such collimation-conserving out-coupling structures are the grooves 21 with reflecting sides or facets 44a-b shown in FIGS. 4a-c.

A comparison between such a configuration with out-coupling grooves 21 having reflective facets 44a-b and configurations without reflective facets will now be made with reference to FIGS. 5a-c and FIG. 6.

Figure 5A:
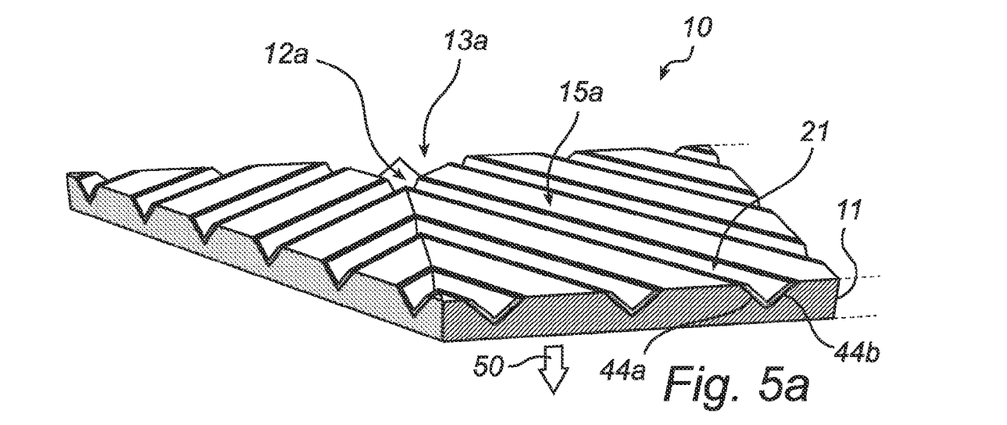
FIG. 5a schematically illustrates a section of a luminaire having out-coupling structures in the form of V-shaped grooves, the facets of the grooves being coated with a reflective layer.
Figure 5B:
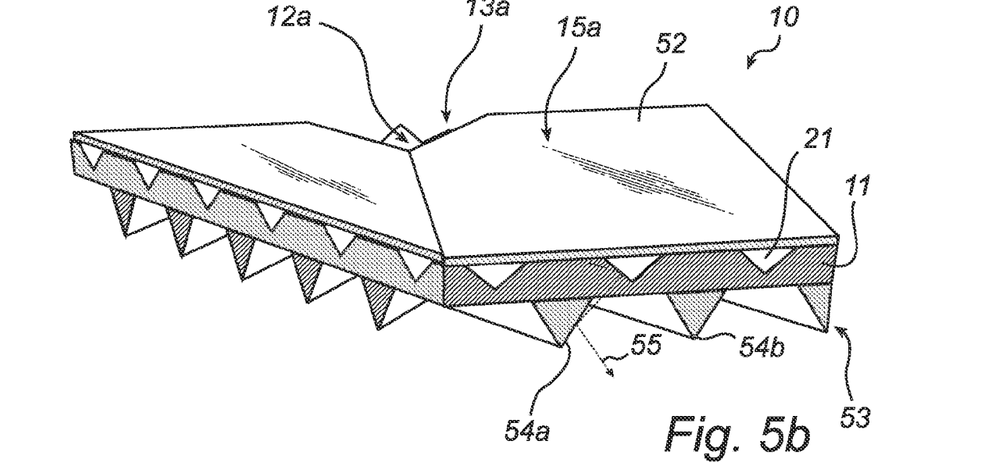
FIG. 5b schematically illustrates the section in FIG. 5a having a reflective film provided adjacent to the light-guide instead of reflective coating in the facets, and a collimating layer.
Figure 5C:
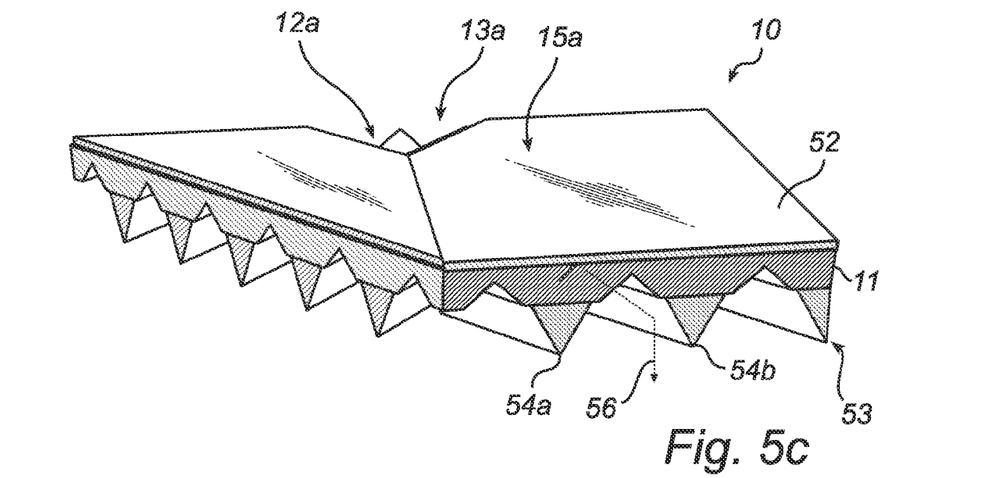
FIG. 5c schematically illustrates another exemplary embodiment having the out-coupling structures provided at the opposite face of the light-guide as compared to the embodiment of FIG. 5b.

In each of FIGS. 5a-c a corresponding portion of a luminaire 10 is shown having a light-source, say 12a in a rectangular recess 13a, and a part of an out-coupling portion 15a having out-coupling structures in the form of V-shaped grooves 21.

In FIG. 5a, which is essentially equivalent to FIG. 4a, the facets 44a-b of the grooves 21 are coated with a reflective layer, and the main direction of the light out-coupled from the luminaire 10 is indicated by the arrow 50.

In the luminaire portion schematically shown in FIG. 5b, the V-shaped grooves 21 are uncoated and the light-guide 11 is instead provided with a reflective film 52 at the face of the light-guide 11 having the V-shaped grooves 21. The light-guide further comprises a collimation layer 53 on the side thereof opposite the reflective film 52. Through the replacement of the reflective coating in the grooves 21 with a reflective film 52 as indicated in FIG. 5b, the collimation conserving ability of the light-guide is decreased compared to the configuration shown in FIG. 5a. This is partly remedied by the provision of the collimating layer 53 as is illustrated by the exemplary out-coupled light beam 55 in FIG. 5b.

The exemplary collimating layer 53 shown in FIG. 5b comprises a plurality of collimating structures in the form of rods 54a-b with triangular cross-section. These rods 54a-b are aligned with the grooves 21 as indicated in FIG. 5b and are preferably attached to the light-guide 11. Between the light-guide 11 and the rods 54a-b some reflective means are preferably provided. Such means may be a reflective layer, an air gap or a glue with a lower refractive index than the material of the light-guide 11. This is to prevent unwanted out-coupling of light from the light-guide 11 through the rods 54a-b.

The collimating layer 53 may be provided in the form of separate rods 54a-b, or as a sheet comprising a plurality of rods. For example, adjacent rods may be joined by perpendicularly extending rods.

FIG. 5c illustrates an alternative to the configuration in FIG. 5b, in which the reflective layer 52 is provided on the side of the light-guide 11 opposite the grooves 21 and the collimating layer 53 is provided on the same side as the grooves 21. The function of the collimating layer 53 is schematically illustrated by the exemplary out-coupled light beam 56 in FIG. 5c.

To demonstrate the collimation conserving properties of the various configurations illustrated in FIGS. 5a-c a computer simulation has been performed for a light-guide having the following measures:

length of outcoupling portion 15a: 72 mm;
width of outcoupling portion 15a: 48 mm;
light-guide 11 thickness: 4 mm;
pitch of the V-grooves 21: 4 mm;
width of the grooves 21: 1 mm;
depth of the grooves: 0.5 mm;
distance between rods 54a-b at base: 2 mm
pitch of rods: 4 mm;
height of rods: 4 mm;
pincushion shaped in-coupling recesses with length of sides: 8.5 mm
radius of curvature of sides: 8 mm; and
light-sources: side-emitting LEDs.

Figure 6:
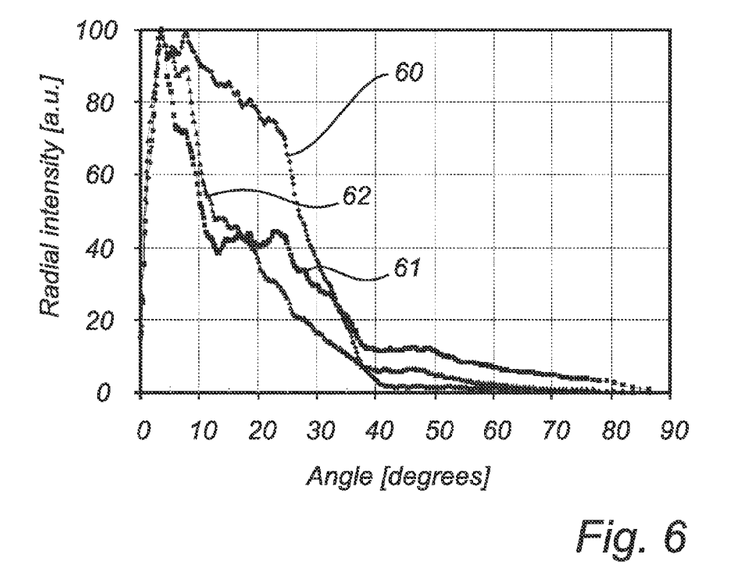
FIG. 6 is a diagram schematically illustrating the angular distribution of out-coupled light for different embodiments.

FIG. 6 shows radial plots 60, 61, 62 of the relative intensity versus angle of the rays of light emitted by the luminaire 10 for different out-coupling configurations.

As can be seen from the radial plot 60 for the configuration of FIG. 5a, the intensity at angles beyond 40° is very low.

When simply replacing the reflective coating on the facets 45a-b of the grooves 21 by a reflective film 52 without also adding a collimating layer, there is considerable intensity also at larger angles as is illustrated by the radial plot 61.

As is evident from the last plot 62 in FIG. 6, the results are considerably improved by adding a collimating layer as shown in FIG. 5b. When analyzing the angular distribution of light emitted by a luminaire 10 such as that shown in FIG. 1a having a plurality of light-sources arranged in a square-shaped grid array, minima are found for the directions corresponding to the diagonals of the grid (45°, 135°, 225°, 315° according to the notation used in the description relating to FIG. 1a). These minima are due to the fact that some light will travel between in-coupling portions without being out-coupled, since this light only encounters grooves which are parallel to the light. This (small) fraction of the light is eventually lost at the neighboring in-coupling portion along the relevant diagonal.

Figure 7:
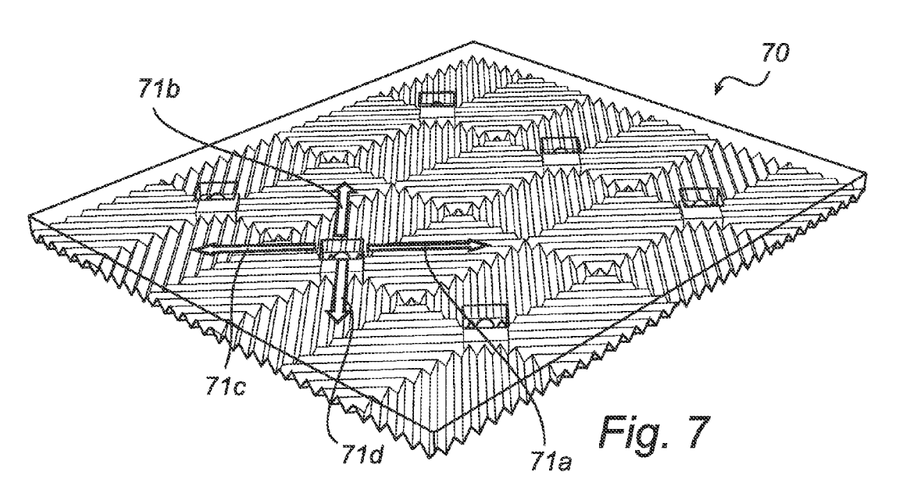
FIG. 7 is a schematic top view of another exemplary embodiment of a luminaire according to the present invention, having a plurality of light-sources arranged in a non-square grid array.

One way of improving the angular non-uniformity resulting from this effect is schematically illustrated in FIG. 7 which is a top view of a luminaire 70 which differs from the luminaire 10 in FIG. 1a in that the light-sources are arranged at grid points in a non-square rectangular grid array. The light emitted by each light-source will, as is also illustrated in FIG. 1a, be split into four orthogonal beams 71a-d. However, as is evident from FIG. 7, the peak distribution of light is no longer aimed at the in-coupling portion on the opposite side of the diagonal, and less light is consequently lost by absorption at neighboring in-coupling portions along the diagonals.

Figure 8:
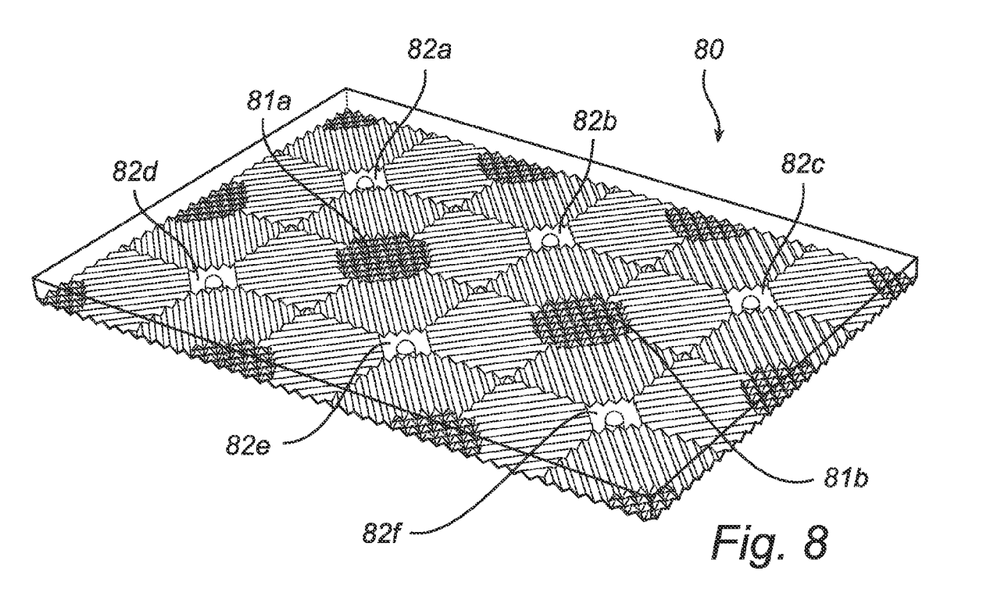
FIG. 8 is a schematic top view of a further exemplary embodiment of a luminaire according to the present invention, having omni-directional out-coupling structures arranged on the diagonals between neighboring in-coupling portions.

Another way of improving the above-discussed angular non-uniformity resulting from absorption of light at neighboring in-coupling portions is schematically illustrated in FIG. 8.

FIG. 8 is a top view of a luminaire 80 which differs from the luminaire 10 in FIG. 1a in that omni-directional out-coupling structures 81a-b are provided on the diagonals between neighboring in-coupling portions 82a-f.

These omni-directional out-coupling structures are capable of out-coupling light traveling in any one of the principal directions (45°, 135°, 225°, 315° according to the notation used in the description relating to FIG. 1a) previously discussed.

In addition to the above-described exemplary embodiments of the present invention, a large number of variations are possible and may, depending on area of application, be advantageous to use.

Figure 9A:
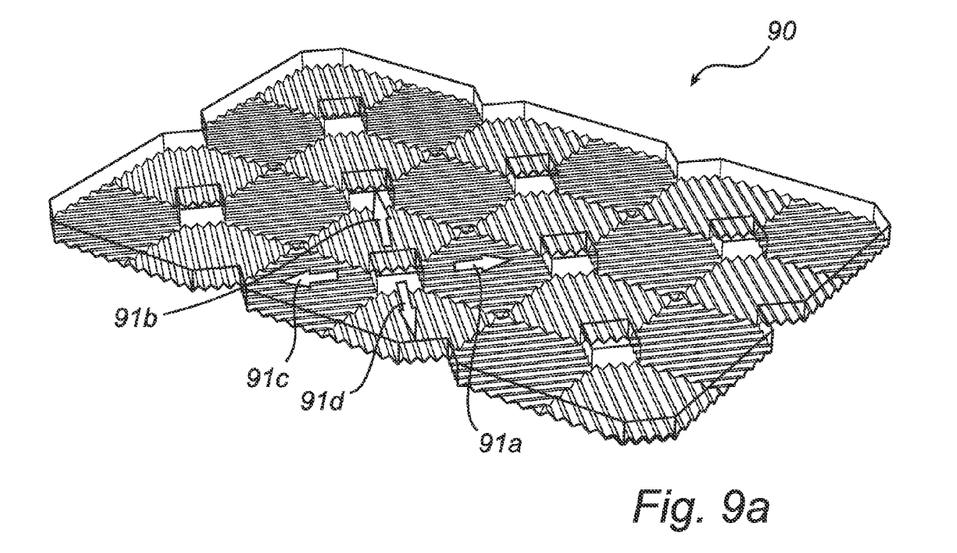
FIGS. 9a-c are schematic top views of additional exemplary embodiments of luminaires according to the present invention.
Figure 9B:
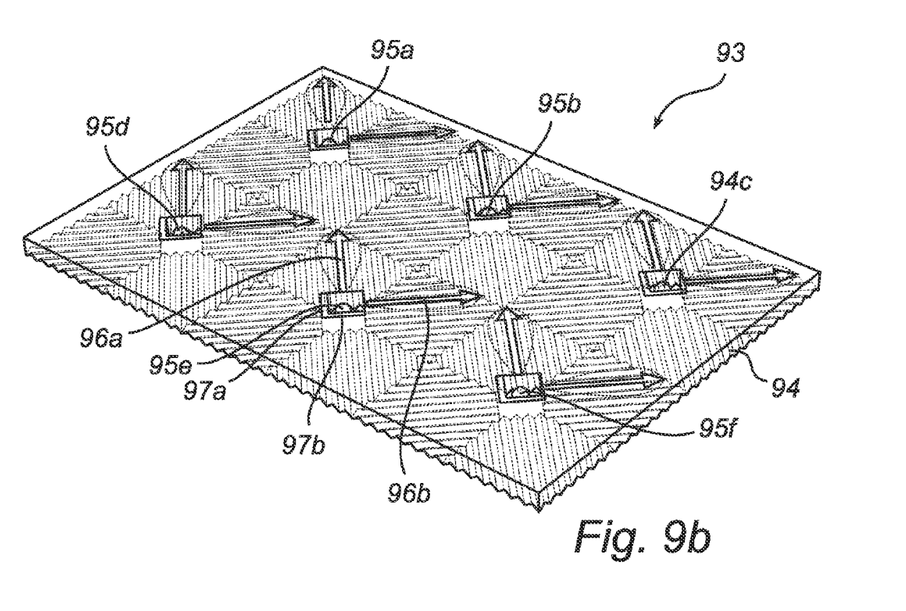
Figure 9C:
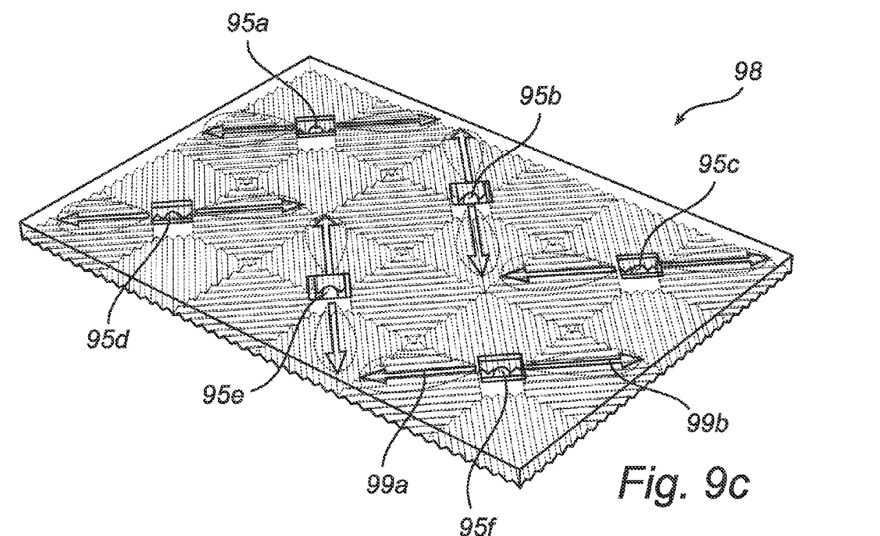

FIGS. 9a-c schematically illustrate two additional exemplary embodiments. It should be understood that the embodiments described herein are merely examples and that a large number of further variations are within the scope of the appended claims.

In FIG. 9a, a luminaire 90 is schematically illustrated, in which the light-sources are more densely distributed and partly share direction dependent out-coupling portions. With this embodiment there is more light loss at neighboring in-coupling portions in the principal directions of the light beams 91a-d. This may, however, be tolerated in cases with a sufficiently large distance between the light-sources.

In the embodiments described so far, the situation with light being in-coupled into the light guide in four main directions with a certain beam width has been described. Obviously, the light-source(s) and/or the in-coupling structures may alternatively be configured in such a way that light is in-coupled in fewer principal directions. Hereby, the interaction between neighboring in-coupling portions may be reduced or even completely eliminated. An exemplary luminaire utilizing light in-coupled in two principal directions only is schematically illustrated in FIG. 9b.

In FIG. 9b, an exemplary luminaire 93 is schematically illustrated comprising a light guide 94, and a plurality of light-sources 95a-f configured to emit light in two principal directions 96a-b only. Each of these light-sources 95a-f may, for example, comprise two unidirectional side-emitters, such as Nichia side-firing LEDs, which are commonly used in back lights for mobile phones.

The unused in-coupling facets 97a-b may be provided with a reflector or an out-coupling facet, in order to reduce interactions between neighboring light-sources.

In FIG. 9c, another exemplary luminaire 98 is schematically illustrated differing from the luminaire 93 in FIG. 9b in that the light-sources 95a-f are instead configured to emit light in two oppositely directed principal directions 99a-b only.

As will be described below with reference to FIGS. 10a-b, the teachings of the present invention can be implemented utilizing a single out-coupling portion and redirection of primary light through reflection. Hereby, a uniformly emitting lighting device, such as a backlight or a luminaire comprising one light-source only can be achieved. Alternatively, as will also be described below, the same principle can be implemented with a plurality of light-sources.

Figures 10A, 10B:
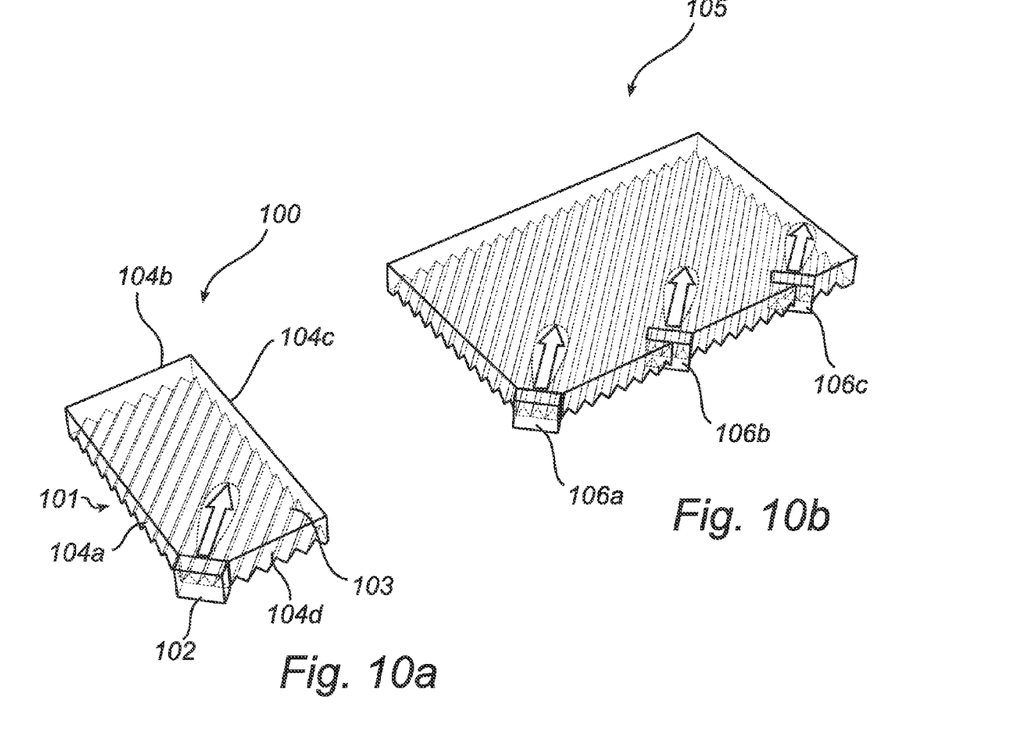
FIGS. 10a-b schematically illustrate further exemplary embodiments utilizing redirection of light through reflection at edges of the light guide.

In FIG. 10a, a lighting device 100 is schematically shown, comprising a light guide 101 and a single side-emitting light-source 102, such as a unidirectional side-firing LED. On at least one of the faces of the light-guide, direction dependent out-coupling structures 103 are provided, which are configured to out-couple light in the principal direction emitted by the light-source 102 with a lower out-coupling efficiency than light having other directions.

As a result thereof, practically no light will be out-coupled before reflection at the reflective edges 104a-d of the light guide 101. By suitably tuning the out-coupling structures 103 with respect to their distance from the reflecting edges 104a-d and the overall geometry of the light-guide 101, a uniform output of light across the lighting device 100 can be achieved with the single light-source 102.

The uniformity of the out-coupled light may be improved further by using diffusively reflecting edges 104a-d. However, this may increase the angular distribution of the out-coupled light.

In FIG. 10b, a similar lighting device 105 is schematically illustrated, which differs from the lighting device 100 in FIG. 10a that several uni-directional light-sources 106a-c are used.

The groove-shaped out-coupling structures implemented in the embodiments described above is only one example of direction dependent out-coupling structures which may be comprised in the light guide according to the present invention.

Figure 11A:
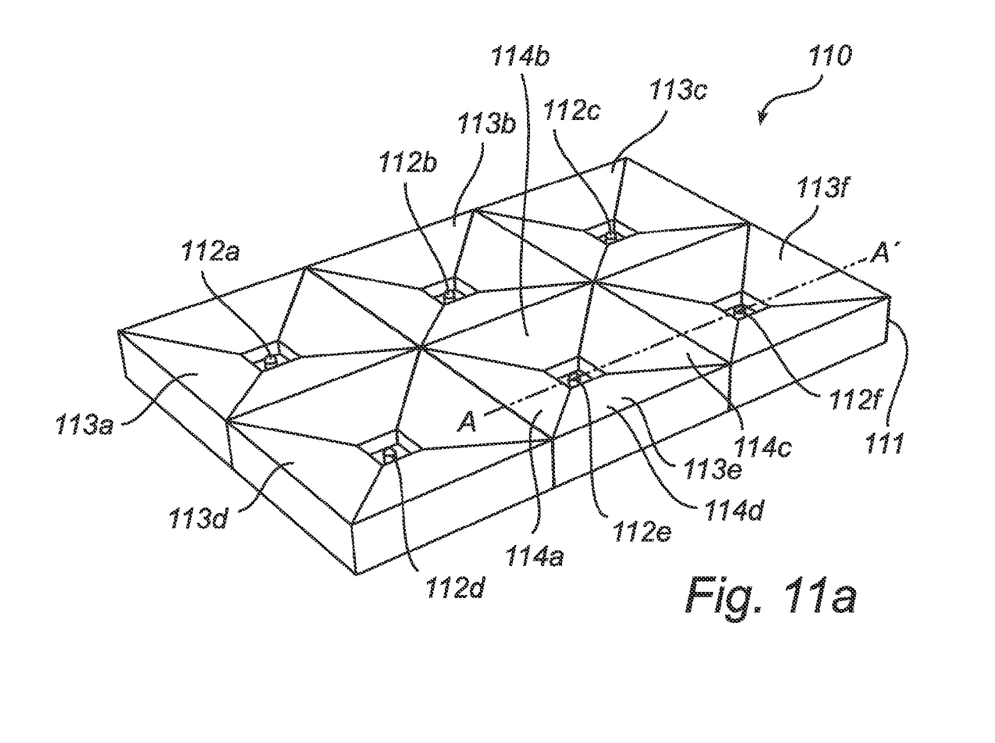
FIG. 11a is a perspective view schematically showing an exemplary luminaire having alternative out-coupling structures.
Figure 11B:
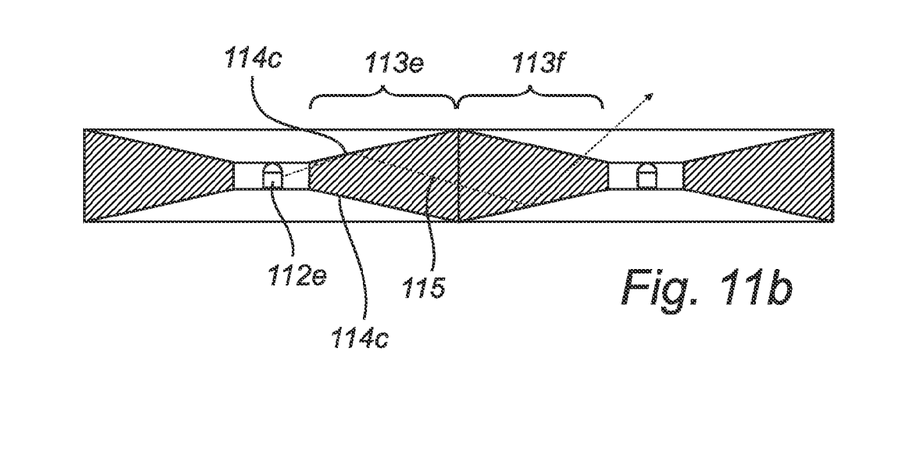

An additional exemplary out-coupling structure, which can be implemented as an alternative to or in combination with the previously described V-shaped grooves, will now be described with reference to FIGS. 1a-b.

In FIG. 11a, an exemplary luminaire 110 is schematically illustrated, comprising a light guide 111 and light-sources 112a-f arranged at corresponding in-coupling portions. The light guide 111 has an out-coupling portion 113a-f adjacent to each in-coupling portion. Each of these out-coupling portions is provided with macroscopic out-coupling structures in the form of slanting facets 114a-d.

The direction dependent out-coupling of these out-coupling structures 114a-d will now be described with reference to FIG. 11b which is a cross-section of the luminaire 110 along the line A-A'.

FIG. 11b schematically shows how a light beam 115 emitted by a light-source 112e is not out-coupled in the out-coupling portion 113e associated with that light-source, since the TIR-condition is fulfilled due to the locally slanting faces 114c of the light guide 111. When the light beam 115 enters the neighboring out-coupling portion 113f, however, it is coupled out of the light guide 111 as indicated in FIG. 11b due to the angle of incidence of the face of the light guide 111.

The person skilled in the art realizes that the present invention by no means is limited to the preferred embodiments. For example, out-coupling grooves having transparent sides on the emitting face of the light guide may be provided instead of, or in combination with the grooves with reflective sides described above. Furthermore, the out-coupling structures may be provided as grooves that extend in a radial direction from each in-coupling portion. Moreover, many other in-coupling configurations are feasible, including recesses or holes having a cylindrical cross-section in the plane of the light guide.

The invention claimed is:

1. A light guide comprising
   first and second oppositely arranged faces;
   an in-coupling portion for in-coupling of light from a light-source; and
   an out-coupling portion located adjacent to said in-coupling portion, wherein
      said out-coupling portion is configured to out-couple a primary light beam having a direction of propagation directed from a position in said in-coupling portion with a lower out-coupling efficiency than a secondary light beam having a direction of propagation directed from a position in the light guide outside said in-coupling portion;
   said out-coupling portion including a plurality of out-coupling structures extending in a general direction of about 45 degrees, 135 degrees, 225 degrees and 315 degrees from said in-coupling portion, and
   said out-coupling structures include a plurality of grooves formed on at least one of said first and second faces of the light guide,
   each of said grooves essentially extending along a projection of a respective one of said primary light beams in said face of the light guide in said out-coupling portion.

2. The light guide according to claim 1, further comprising redirecting means for redirecting said primary light beam, thereby converting said primary light beam into a secondary light beam.

3. The light guide according to claim 1 further comprising an in-coupling structure formed at said in-coupling portion.

4. The light guide according to claim 3, wherein said in-coupling structure comprises beam-shaping means for collimating said in-coupled light.

5. The light guide according to claim 3, wherein said in-coupling structure comprises a recess formed in said light guide from said first or second face.

6. The light guide according to claim 5, wherein said recess has a substantially rectangular cross-section in a plane parallel to said light guide, thereby enabling collimation of in-coupled light in a plane parallel with said light guide.

7. The light guide according to claim 1, comprising a plurality of collimating structures being aligned with a corresponding plurality of said out-coupling structures.

8. The light guide according to claim 1, further comprising a reflective layer arranged on one side thereof at least at said out-coupling portion.

9. The light guide according to claim 1, comprising a plurality of in-coupling portions, each being adapted to in-couple light from an associated light-source, and a plurality of out-coupling portions, each being adjacent to a corresponding one of said in-coupling portions and configured to out-couple a primary light beam having a direction of propagation directed from a position in said corresponding in-coupling portion with a lower out-coupling efficiency than a secondary light beam having a direction of propagation directed from a position in the light guide outside said corresponding in-coupling portion.

10. The light guide according to claim 9, further comprising at least one guiding portion located between neighboring out-coupling portions to prevent cross-talk therebetween.

11. The light guide according to claim 9 wherein said in-coupling portions are arranged in an array forming a rectangular grid pattern.

12. A light-output device comprising a light-guide according to claim 9 having redirecting means arranged between adjacent out-coupling portions, said light-output device further comprising a plurality of light-sources each being arranged at a respective one of said in-coupling portions, wherein neighboring ones of said light-sources are adapted to emit differently colored light, thereby improving color uniformity of light output by said light-output device.

13. A light output device comprising a light guide according to claim 1 and at least one light-source arranged at said in-coupling portion.

14. The light-output device according to claim 13, wherein the light-source comprises at least one light-emitting diode.

15. A light guide, comprising:
   a light source positioned within a light guide;
   said light source placed within a centrally located in-coupling recess in said light guide, said in-coupling recess being substantially rectangular substantially within a plane of said light guide;
   said in-coupling recess having four associated regions each having groove shaped out-coupling structures extending away from said centrally located in-coupling recess,
   said four associated regions extending away from said in-coupling recess in a substantially first, second, third and fourth direction;
   wherein said in-coupling recess and said out-coupling structures separate light from said light source into substantially four separate light beams along a first and second orthogonal axis relative to said central located recess.

* * * * *